Feb. 5, 1952  W. W. VANDER CLUTE  2,584,643
TRAP
Filed July 31, 1945
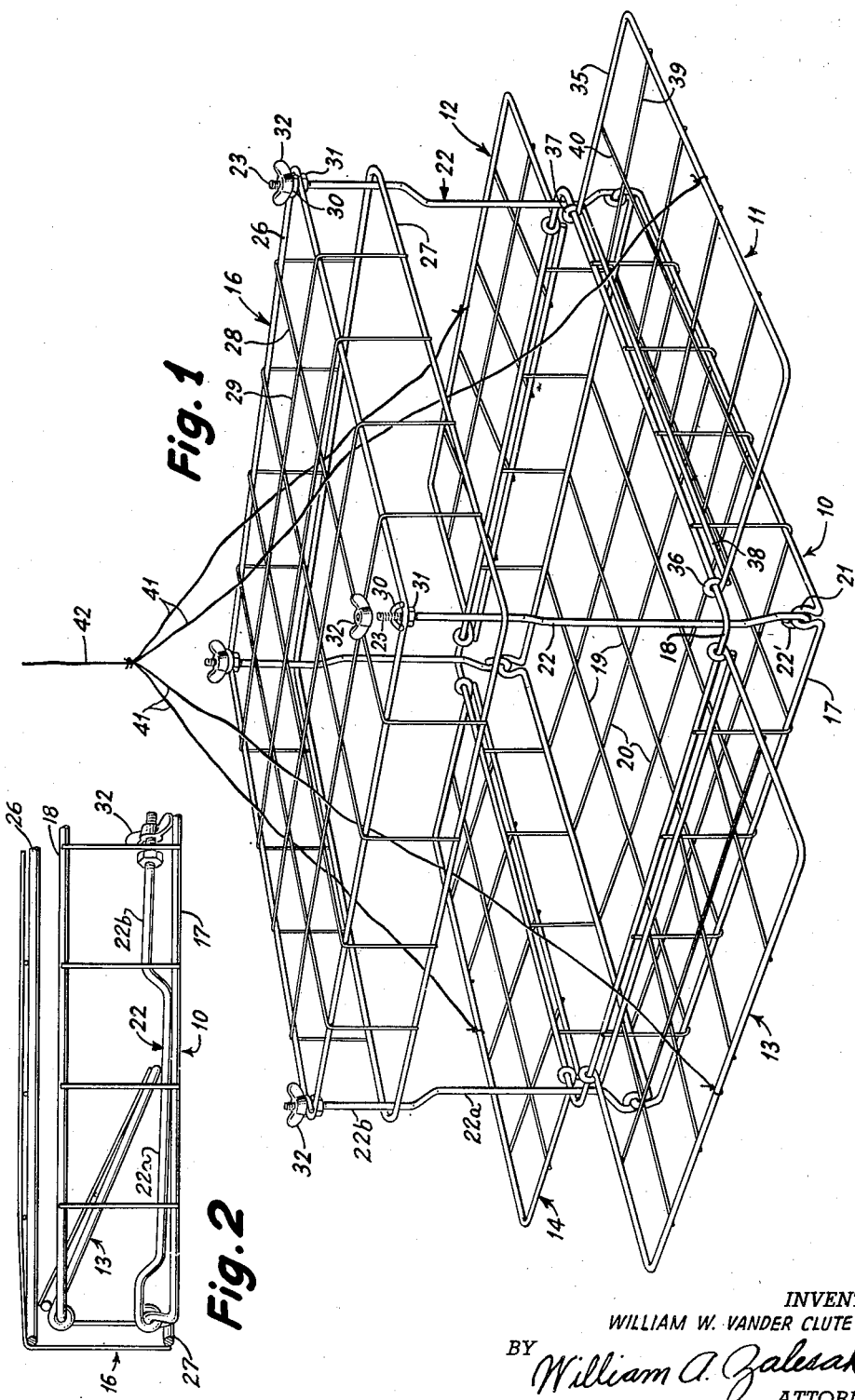
INVENTOR
WILLIAM W. VANDER CLUTE
BY William A. Zalesak
ATTORNEY Patented Feb. 5, 1952

2,584,643

UNITED STATES PATENT OFFICE 2,584,643

TRAP

William W. Vander Clute, Elizabeth, N. J., assignor to Vander Clute Corporation, a corporation of New Jersey Application July 31, 1945, Serial No. 607,944

7 Claims. (Cl. 43—105)

My invention relates to traps, particularly to collapsible crab traps.

One type of conventional trap is provided with flat top and bottom sections made of wire mesh with pivoted sides, which in open position lie in the same plane as the bottom section on the bottom of the river bed or ocean bed. This type of trap is open to a number of objections in that in existing traps the side flaps, because they rest on the river bed, scoop up mud and seaweed, preventing the closing of the trap and thus allowing the crabs to escape in addition to bringing up considerable mud and weeds, which is objectionable.

In the usual trap when a movement is made to close the trap the crab is startled, causing the crab to attempt to escape by swimming upwardly and backwardly. In the usual trap the crab on contact with the top section swims along the bottom of the section and out through the sides before the flaps close, thus permitting the crab to escape the trap.

The usual collapsible trap is difficult to assemble and as a result the effort required for disassembling the trap makes it undesirable to fold the trap, thus defeating the purpose of the design and resulting in a bulky piece of equipment. The snap hooks used on this type of trap also scrape off protective coating, causing rusting of the wires of the framework.

It is an object of my invention to provide an improved collapsible trap that is positive acting, strong and is easy to assemble and collapse, and which when not in use folds into a convenient package for carrying and storing.

Another object of my invention is to provide an improved trap of this type having features which improve the efficiency of the trap in operation and avoid the objections pointed out above.

These and other objects will appear hereinafter.

The novel features which I believe to be characteristic of my invention are set forth with particularity in the appended claims, but the invention itself will best be understood by reference to the following description taken in connection with the accompanying drawing in which Figure 1 is a perspective view with the trap open in position ready for operation, and Figure 2 shows a partial section of the trap in knocked-down folded arrangement for transportation.

Referring to Figure 1, the trap comprises generally a pair of basket-like units including a bottom section or member 10 and a top section 16 mounted in fixed spaced relationship and provided with four horizontally extending pivoted flaps 11, 12, 13 and 14 for closing the trap.

The bottom section 10 comprises a pair of rim members 17 and 18 of comparatively heavy wire, the corner portions of the bottom rim 17 being provided with loops such as 21. A mesh network comprising the crossed wires 19 and 20 is secured to the bottom rim member 17 and extends vertically to contact and be welded to the upper rim member 18. Pivoted to each eye member 21 is a vertically extending rod-like element 22 having eye 22' pivoted in the eye 21. Each element 22 is provided with an intermediate offset portion 22a to clear rim member 18. The upper end of the rod-like element 22 is threaded at 23. These spacing elements 22 are mounted to pivot vertically toward the upper rim member 18 which limits outward movement of elements 22.

The top unit comprises an inverted basket-like section comprising rim members 26 and 27 to which are fastened the cross wire elements 28 and 29. Each corner of the upper rim member 26 is provided with an eyelet 30 through which the upper ends of the vertical tie members 22 extend, the eyelet resting on the nut 31 and being secured to the upper end 22b of rod-like element 22 by wing nuts 32.

Each pivoted flap member, such as 11, comprises a U-shaped rim member 35 having cross wire members 39 and 40 and eyelets 36 and 37 at the ends of the legs for pivotally mounting the flap on the upper rim member 18 of the bottom basket section. A rod-like cross member 38 secured to the outside of the legs of the member 35 is positioned so it contacts the vertical portions of the cross members 19 and 20 to prevent the flaps from touching the river bottom and maintaining the flaps in substantially horizontal position or in a position not differing greatly from the horizontal position. When the trap is resting on the river bed or ocean bed, it is open in the position shown since the flaps when in vertical position extend at an angle less than vertical, since the upper basket unit portion 16 is of a larger perimeter than the lower basket portion and causes the flaps to lean outwardly when in closed position. This off-centering causes the flaps to drop outwardly when the closing tie elements or cords 41 and 42 are released. In operation the flaps are quickly moved to closed position by a tug on the line 42, quickly trapping any crabs which may be within the trap.

As shown in the partial section of Figure 2, when the trap is to be folded the nuts 32 are removed from the upper ends of the rods 22 and the upper basket portion raised, allowing pivoted members 22 to be diagonally rotated and crossed across the bottom part of the bottom basket section 10. The flaps are then pivoted inwardly as indicated and the top section 16 then dropped over the lower section as shown, thereby making a compact package for carrying and also permitting quick assembly and disassembly of the unit.

Because the flaps are above the river bed and maintained in a substantially horizontal position, mud is neither stirred up nor scooped, nor do the sides become tangled in seaweed resting on the bottom of the river bed. Due to the fact the upper portion of the crab trap is provided with vertical sides, the crab cannot easily escape through the top portion of the trap, which is quickly closed when the haul cord is pulled.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A collapsible crab trap including a lower basket member of rectangular shape open at the top and provided with a rim member, pivotally mounted spacing elements mounted in each corner and at the bottom of said basket member and extending vertically and movable inwardly of said basket member, an inverted basket member mounted at the upper ends of said vertical spacing elements and secured thereto, flap members pivoted to the rim member of said lower basket member and extending between said basket members when said flaps are in closed position, and means for closing said flap members including hauling cords extending through the top basket unit of said trap.

2. A collapsible crab trap including a lower basket member of foraminous construction open at the top and provided with upper and lower rim elements, pivotally mounted spacing elements mounted on the lower rim element and movable toward the upper rim element to extend vertically, an inverted basket member of foraminous construction mounted at the upper ends of said vertical spacing elements and secured thereto, flap members pivoted to the upper rim element of said lower basket member and extending between said basket members when said flaps are in closed position, said flap members forming the only closure members between said basket members and means for closing said flap members, said flap members being mounted to pivot outwardly and downwardly when said closing means is released.

3. A collapsible crab trap comprising a bottom basket section of rectangular shape and including top and bottom rim members, the bottom rim member being provided at each corner with an eyelet, rod-like spacing elements pivoted at their lower ends to each of said eyelets and extending vertically from said bottom basket section, a top basket section inverted over said bottom basket section and including eyelets in the corners of said top basket section, said spacing elements extending through said last eyelets, means for securing said top basket section to the upper ends of said spacing elements, a pivoted flap member at each side of said bottom basket section and extending substantially coextensive with said side of said bottom basket section and pivoted to the top rim member, means for maintaining said flap in substantially horizontal position when said flap member is open, said flap members having such dimensions that the space between said basket sections is closed when said flap members are moved to closed position against said top basket section, and means for operating the flap members to closed position.

4. A collapsible crab trap comprising a bottom basket section of rectangular shape, rod-like spacing elements pivoted at their lower ends to the bottom of said bottom basket section and extending vertically from said bottom basket section, a top basket section inverted over said bottom basket section and of larger dimensions than said bottom basket section, means for securing said upper basket section to the upper ends of said spacing elements, and a pivoted flap member at each side of said bottom basket section and extending substantially coextensive with the side of said bottom basket section and pivoted to the top of said bottom basket section, said flap member having such dimensions that the space between said basket sections is closed when said flap members are moved to closed position against said top basket section, said rod-like spacing elements being foldable against the bottom of said bottom basket section and said flap members being movable into position within said bottom basket section, and said top basket section receiving within itself said bottom basket section, spacing elements and flap members when said trap is in collapsed position.

5. A collapsible crab trap comprising a bottom basket section and including top and bottom rim members, the bottom rim member being provided with spaced eyelets, rod-like spacing elements pivoted at their lower ends to each of said eyelets and extending vertically from said bottom basket section, a top basket section inverted over said bottom basket section and including eyelets registering with the eyelets in said bottom basket section, said spacing elements extending through said last eyelets, and means for securing said upper basket section to the upper ends of said spacing elements, pivoted flap members pivoted to the top rim member of said bottom basket section, and means for maintaining said flap members in substantially horizontal position when said flap members are open, said flap members having such dimensions that the space between said basket sections is closed when said flap members are moved to closed position against said top basket section, said flap members forming the only closure members between said basket members and hauling cords connected to the free ends of each of said flap members and extending through the upper basket section for operating the flap members to closed position.

6. A collapsible trap comprising a bottom basket section of rectangular shape, rod-like spacing elements pivoted at their lower ends to the bottom of said bottom basket section and extending vertically from said bottom basket section, a top basket section inverted over said bottom basket section and of larger dimensions than said bottom basket section, and means for securing said top basket section to the upper ends of said spacing elements, said rod-like elements having an intermediate inwardly offset portion, the said intermediate portions adjacent said pivoted end engaging the upper portion of said bottom basket section and the upper portions of said spacing elements engaging the top of said top basket section, and a pivoted flap member at each side of said bottom basket section and extending substantially coextensive with the sides of said bottom basket section and pivoted to the top of said bottom basket section, said flap members having dimensions such that the space between said basket sections is closed when said flap members are moved to closed position against said top basket section, said rod-like spacing elements being foldable against the bottom of said bottom basket section, and said flap members being movable into position within said bottom basket section, and said top basket section receiving within itself said bottom basket section, spacing elements and flap members when said trap is in collapsed position.

7. A collapsible trap comprising a bottom basket section of rectangular shape and including top and bottom rim members, the bottom rim member being provided at each corner with an integral eyelet, rod-like spacing elements pivoted at their lower ends to each of said eyelets and extending vertically from said bottom basket section, a top basket section of larger dimensions than said bottom basket section inverted over said bottom basket section and including eyelets in the corners of said top basket section, said spacing elements extending through said last eyelets and means for securing said top basket section to the upper ends of said spacing elements extending through said last eyelets and means for securing said top basket section to the upper ends of said spacing elements, said rod-like spacing elements having inwardly offset intermediate portions between said basket sections, the upper ends of said rod-like spacing elements being offset outwardly toward the sides of the top basket section for rigidly supporting said top basket section, the lower portion of said intermediate portions of said rod-like elements extending toward the upper rim member of said bottom basket section, a pivoted flap member at each side of said lower basket member and extending substantially coextensive with said side of said bottom basket section and pivoted to the top rim member, means for maintaining said flap member in substantially horizontal position when said flap member is open, said flap member when in closed position extending between said basket sections and cords connecting the free ends of said flap members and extending through the top basket section for operating the flap members in closed position.

WILLIAM W. VANDER CLUTE.

REFERENCES CITED

The following references are of record in the file of this patent:

UNITED STATES PATENTS

| Number | Name | Date |
|---|---|---|
| 211,094 | Henry | Jan. 7, 1879 |
| 1,173,134 | Whitney | Feb. 22, 1916 |
| 1,240,487 | Reed | Sept. 18, 1917 |
| 1,336,191 | Bour | Apr. 6, 1920 |
| 1,395,554 | Brown | Nov. 1, 1921 |
| 1,531,299 | Merle | Mar. 31, 1925 |
| 1,619,366 | Petersen | Mar. 1, 1927 |
| 1,648,025 | Molloy | Nov. 8, 1927 |
| 1,728,645 | Ward et al. | Sept. 17, 1929 |
| 1,772,814 | Laycock | Aug. 12, 1930 |
| 1,798,810 | Rice et al. | Mar. 31, 1931 |
| 1,839,173 | Dorathy et al. | Dec. 29, 1931 |
| 1,968,758 | Gatch | July 31, 1934 |
| 2,218,843 | Fuller | Oct. 22, 1940 |

FOREIGN PATENTS

| Number | Country | Date |
|---|---|---|
| 237,517 | Great Britain | July 30, 1925 |

OTHER REFERENCES

Webster's International Dictionary, page 227, second edition, published by G. and C. Merriam Co., 1934.